United States Patent [19]

Marroquin

[11] 4,388,100
[45] Jun. 14, 1983

[54] SHEAR MECHANISM FOR MACHINES FOR THE MANUFACTURE OF ARTICLES OF GLASS OR OTHER MATERIALS

[75] Inventor: Elio G. Marroquin, Monterrey, Mexico

[73] Assignee: Vitro Tec Fideicomiso, Monterrey, Mexico

[21] Appl. No.: 328,610

[22] Filed: Dec. 8, 1981

[51] Int. Cl.³ .............................................. C03B 5/38
[52] U.S. Cl. ...................................... 65/334; 65/332; 83/602; 83/699
[58] Field of Search ................... 65/332, 334; 83/602, 83/699, 700

[56] References Cited

U.S. PATENT DOCUMENTS

| | | | |
|---|---|---|---|
| 2,401,994 | 6/1946 | Weber | 65/334 X |
| 2,812,619 | 11/1957 | Wythe | 65/334 X |
| 3,758,286 | 9/1973 | Heyne | 65/334 |
| 3,850,607 | 11/1974 | Cook | 83/699 X |
| 3,996,037 | 12/1976 | Wythe | 65/334 |
| 4,214,497 | 7/1980 | Dahms | 65/334 X |
| 4,246,819 | 1/1981 | Dahms | 83/699 X |

Primary Examiner—Arthur D. Kellogg
Attorney, Agent, or Firm—Kemon & Estabrook

[57] ABSTRACT

In a glass molding machine, for example, of the type known in the industry as I.S. machines, an apparatus for shearing molten glass into gobs as the glass issues from a feeder includes mechanisms for independently adjusting both the horizontal and vertical position of the shears with respect to the feeder nozzles, as well as the distance between the two halves of the shear blades and the length and time duration of the cutting stroke. All adjustments are possible without shutting down the entire forming operation and can be effected merely by supplying energy to adjusting motors.

3 Claims, 5 Drawing Figures

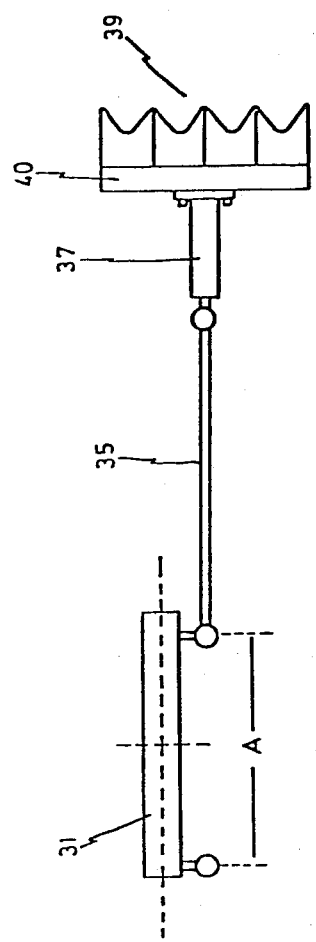
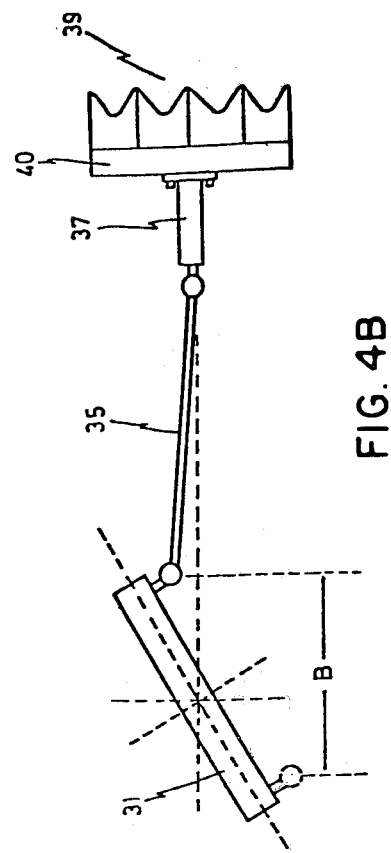
FIG. 4A
FIG. 4B

SHEAR MECHANISM FOR MACHINES FOR THE MANUFACTURE OF ARTICLES OF GLASS OR OTHER MATERIALS

BACKGROUND OF THE INVENTION

In the production of glass containers such as bottles, jars, etc., a reservoir of molten glass is maintained in a glass feeder and is periodically released through one or more nozzles to a shear mechanism which cuts the molten glass streams into portions called gobs. The gobs are distributed by means well known in this art to the individual forming sections of the machine, generally eight in number where the glass is then given its final desired shape.

Improper cutting by the shears to form the gobs can result in the formation of defective glass articles. One such defect appears in the surface of the articles in the form of long thin stripes and these are known in the trade as cutting marks. Such defects result from an improper operation of the shears resulting in an improper cut of the gob and this is usually due to either a misalignment or improper meeting of the cutting blades. Inasmuch as these defects are not detectable until the finished ware is inspected, improper shear operation can result in a significant quanitity of defective articles before the problem is detected and corrected.

A defective cut can also result in gobs which are either too large or too small resulting in either an over consumption of glass with a consequent rise in the cost of production or in the case of too small a gob a formation of defective articles.

Known shearing mechanisms for this purpose generally include a frame which supports a pair of arms with a cutting blade at the end of each arm respectively. The arms are generally pivoted at the ends opposite the blade supporting ends and positioned to effect a cutting stroke immediately below the feeder outlets. The continuous movement of the arms is generally synchronized by a cam or gear arrangement which opens and closes the arms at a rate depending on the diameter weight and size of the gob necessary for the production of a given article. Prior art examples of this general type of shear mechanism may be found in the following U.S. patents:

Walter C. WEBBER: 2,401,994-1946
Frederick J. WYTHE: 2,812,619-1957
Clarence A. HEYNE: 3,758,286-1973
Kurt BECKER: 3,786,707-1974

Due primarily to the complexity of these mechanisms as typified in the above listed prior art patents, a series of problems have developed causing defects and irregularities in the cutting of glass gobs issuing from a feeder with a consequent loss of finished articles due to defective forming. One such problem arises when utilizing cams such as shown in the above mentioned patent to Webber and or gear mechanisms as shown in the above mentioned patents to Wythe, Heyne and Becker. Operation of the shears must be perfectly synchronized with the feeder mechanism. The main disadvantage with the cams and or gears of the prior art is the high rate of wear on these parts due to the fact that they operate continuously under conditions of high temperature and high mechanical loads. The problem of wear is such mechanisms can only be resolved by parts replacement which necessitates a complete shutdown of the entire forming operation with a consequent loss in production.

Another disadvantage of the shear mechanisms of the prior art is that whenever the production speed of the entire forming machine is to be changed depending upon the size and desired shape of the gob, it is necessary to shut down the entire machine for a considerable time in order to exchange cams and or gears to maintain the required synchronism between the shear mechanism and the feeder. The same problem arises when it is desired to change the number of feeding orifices.

A final disadvantage of the prior art shear mechanisms is the lack of flexibility to effect adjustments in the cutting arms again making it necessary to shut down the entire operation to effect such adjustments with a corresponding loss in machine output.

BRIEF SUMMARY OF THE INVENTION

According to the present invention, a glass gob shearing mechanism includes mechanisms for independently adjusting both the horizontal and vertical position of the shears with respect to the feeder nozzles as well as the distance between the two shear halves and the length and time duration of the cutting stroke. All of these adjustments are completely independent of each other and all can be made without the necessity of shutting down the entire forming operation.

BRIEF DESCRIPTION OF THE DRAWINGS

FIGS. 4a and 4b are diagrams to illustrate the drive and adjustment mechanism for the cutting stroke of the shear blades.

DETAILED DESCRIPTION OF THE DRAWINGS

Figure 1:
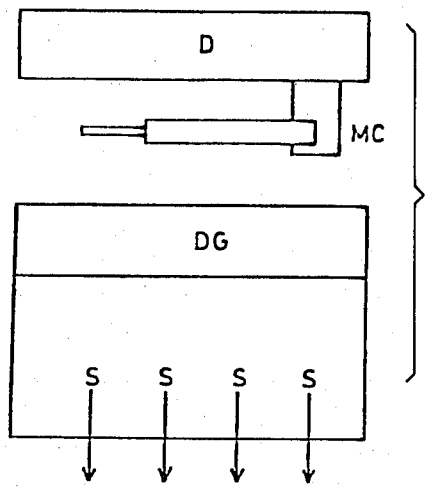
FIG. 1 is a diagram of the fabrication process with which the present invention is intended to be used.

Referring first to FIG. 1, which is a schematic diagram of the process for fabricating glass articles such as bottles, jars, etc., a feeder D which maintains a reservoir of molten glass, feeds this molten glass through a plurality of nozzles or orifices to a shear mechanism MC which cuts the glass into successive portions called gobs. The gobs are distributed by means of a distributor DG to the individual forming sections S where the gobs are given the desired final configuration such as bottles or other containers.

Figure 2:
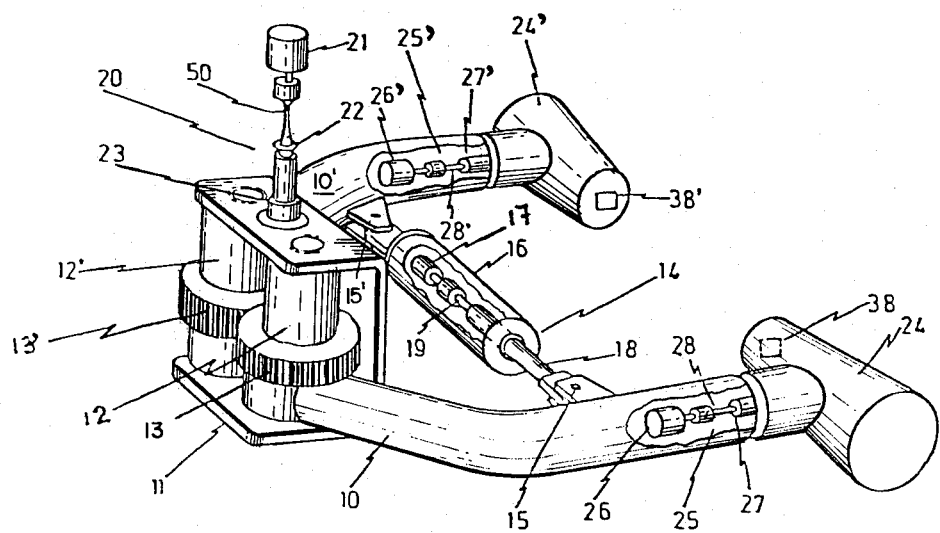
FIG. 2 is a perspective view with parts broken away of the main supporting elements for the shears proper.

Referring now to FIG. 2 which shows a preferred embodiment of a shearing mechanism in accordance with the present invention, a pair of hollow supporting arms 10, 10', are supported in a U-shaped frame 11 on a pair of vertical shafts 12, 12', respectively. The shafts have rigidly attached meshing gears 13, 13', so that movement of the arms 10 and 10' are positively tied together. Extending between the arms 10 and 10' is an adjusting mechanism 14 pivotally connected to each arm by hinge members 15, 15'. A cylinder or housing 16 encloses a stepping motor 17 coupled to a rod 18 by means of a ball screw and nut assembly 19. Rotation of the stepping motor 17 therefore, is effective to determine the spacing between the arms 10, 10'. This mechanism is also used to facilitate replacement of the shear blades which are carried at the outer ends of the arms 10, 10' in a manner to be herein described.

The entire shear assembly is vertically adjustably supported with respect to the feeder by means of a further adjusting mechanism 20 which includes a stepping motor 21 coupled to rotate a screw 50 which is supported on the feeder D. A ball nut 22 held through a rod 23 is fixed in the upper part of the support frame 11.

At the outer end of each of the arms 10, 10', are a pair of hollow casings 24, 24' and these are telescopically supported on each arm. Mechanism for adjusting the position of each of the casings 24 with respect its respective arm is by way of adjusting mechanism 25, 25' which includes stepping motors 26, 26' for advancing or withdrawing rods 27, 27' through ball screw and nut assemblies 28 and 28'.

Figure 3:
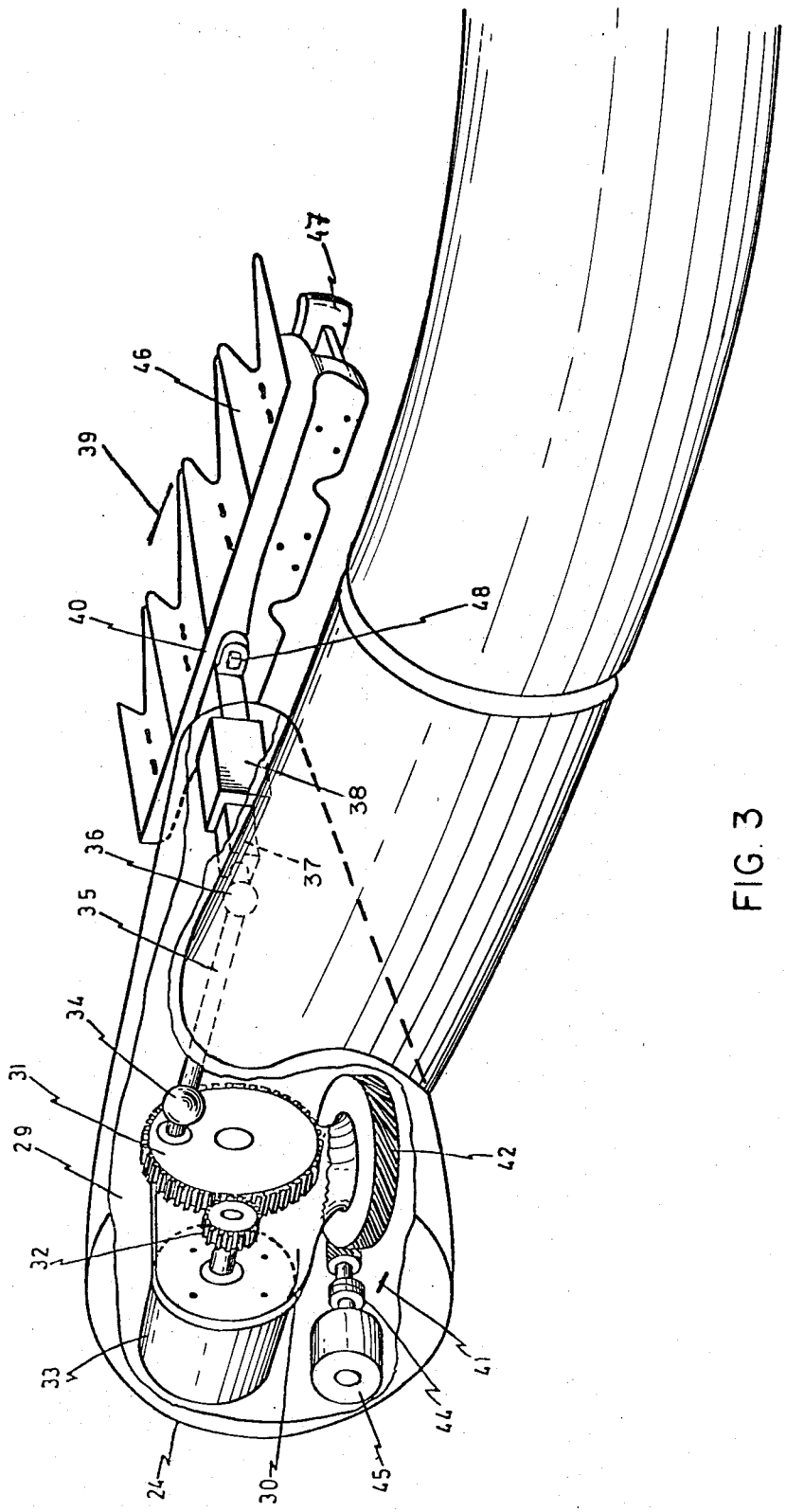
FIG. 3 is a perspective view with parts broken away showing an adjusting and drive mechanism for one half of a shear couple.

Referring now to FIG. 3 for a description of the shear blade support and drive means, one of the casings 24 is broken away to show a drive and adjusting mechanism 29. A frame 30 received within the housing 24 forms a support for a gear 31 driven by a pinion gear 32 affixed to the shaft of a motor 33. The drive gear 31 carries a crank 34 for driving one of the shear blades through a connecting rod 35 and trunion 36. The latter member is attached to cutting blade assembly 39 including a rectangular shaft 37 slidably mounted in a housing 38 and at its outer end a shear blade support arm 40 having a plurality of cutting blades 46 mounted thereon. The cutting members 46 may be secured in any known fashion as by a fastener 48. Positioned immediately below each blade is a gob guide 47 which insures proper fall of the gobs to the distributor. Rotation of the motor 33, therefore, is effective through the mechanism shown to reciprocate the shear blade.

As also indicated in this Figure, the support 32 carrying the motor 33 and the drive gear 31 is mounted for rotation about a vertical axis on the center of the gear 42. An adjusting motor 45 is arranged to drive the gear 42 through a coupling 44. As shown in FIGS. 4a and 4b, rotation of the gear 42 is effective to change the vertical plane of the driven gear 31. As shown in FIG. 4a, a maximum length stroke for the shear blade 39 is provided whereas in the adjusted position of FIG. 4b, a shorter stroke results. In this manner, it will be recognized by those skilled in this art that the mechanism may be adjusted for production of different sized gobs.

Likewise, the entire mechanism can be positioned with respect to the feeder to provide correct centering of the blades with the feeder orifices or nozzles all by means of simple rotation of the electric motor drives for the different adjustments. Therefore, the shear mechanism can be positioned at the output of the feeder so that the arms 10, 10' can be adjusted for a predetermined blade distance, the casings 24, 24' will be located to a desired position with respect to the arms 10, 10' depending on the type or size of the feeder and the drive mechanism 29 will be positioned according to a desired cutting velocity and length of stroke.

While a preferred embodiment of the present invention is herein shown and disclosed, Applicant claims the benefit of a full range of equivalents within the scope of the appended claims.

I claim:

1. Glass gob shearing apparatus for use with automatic container molding machines comprising:
    a housing;
    a pair of horizontally spaced vertical shafts rotatably journaled in said housing each shaft including gear means affixed thereon and engaging each other so that said shafts rotate together by equal and opposite amounts;
    a pair of horizontally extending shear blade supporting arms having one end affixed to each of said shafts respectively;
    adjustable means joining said arms intermediate their ends;
    means for vertically adjustably supporting said housing below the level of the feed orifices of an automatic glass feeder;
    a pair of elongated hollow casings one coupled across the opposite ends of each of said arms respectively so that said casings face each other and the longitudinal axes of said casings are in substantial alignment;
    means for independently adjusting the horizontal position of said casings along the longitudinal axis of said arms;
    shear blade supporting means horizontally slidably supported within each of said casings respectively and carrying replaceable shear blades at their facing ends;
    means within each of said casings for positively reciprocating said supporting means to effect cutting of molten glass from the feeder orifices into gobs; and
    means for adjusting the time and length of stroke of said supporting means.

2. Glass gob shearing apparatus as defined in claim 1 in which said arms are hollow and enclose said casings adjusting means.

3. Glass gob shearing apparatus as defined by claim 1 in which the means for reciprocating the blade support means includes:
    a support frame;
    a gear journaled in said frame;
    means for rotatably driving said gear;
    a crank carried by one face of said gear;
    a connecting rod connecting said crank and blade supporting shaft; and
    means for rotating said frame on a vertical axis to change the effective length of stroke and speed of said connecting rod.

* * * * *